Figure 3:
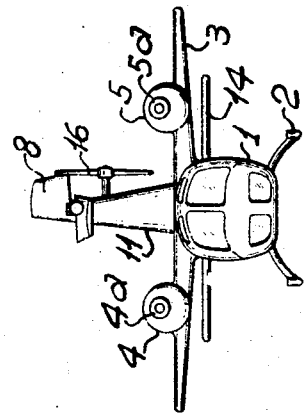

United States Patent
Monti

[15] 3,698,666
[45] Oct. 17, 1972

[54] HIGH-SPEED HELICOPTER CHARACTERIZED BY A LIFTING WING AND BY TWO ENGINES FITTED THEREON

[72] Inventor: Giancarlo Monti, Varese, Italy
[73] Assignee: Siai-Marchetti S.p.A., Varese, Italy
[22] Filed: Jan. 19, 1970
[21] Appl. No.: 4,143

[30] Foreign Application Priority Data
Jan. 24, 1969 Italy..................11961 A/69

[52] U.S. Cl. .............................................244/7 A
[51] Int. Cl..............................................B64c 27/22
[58] Field of Search..................244/7 R, 7 A, 118 P

[56] References Cited
UNITED STATES PATENTS 3,540,680 11/1970 Peterson....................244/7 R
3,159,360 12/1964 Ryan et al..................244/7 A
2,774,552 12/1956 Glad........................244/118 P
2,964,263 12/1960 Arena........................244/7 A Primary Examiner—Milton Buchler
Assistant Examiner—Carl A. Rutledge
Attorney—Kurt Kelman

[57] ABSTRACT

A helicopter with a fixed wing on each of which is located an engine has a central horizontal rotor connected to both engines, as is a tail rotor. A third rotor blade is mounted directly on the wing opposite to that of the tail rotor to blance the torque of the tail rotor.

7 Claims, 6 Drawing Figures

PATENTED OCT 17 1972 3,698,666

SHEET 1 OF 2

INVENTOR.
GIANCARLO MONTI
BY
AGENT

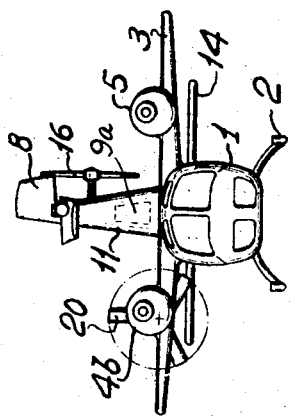
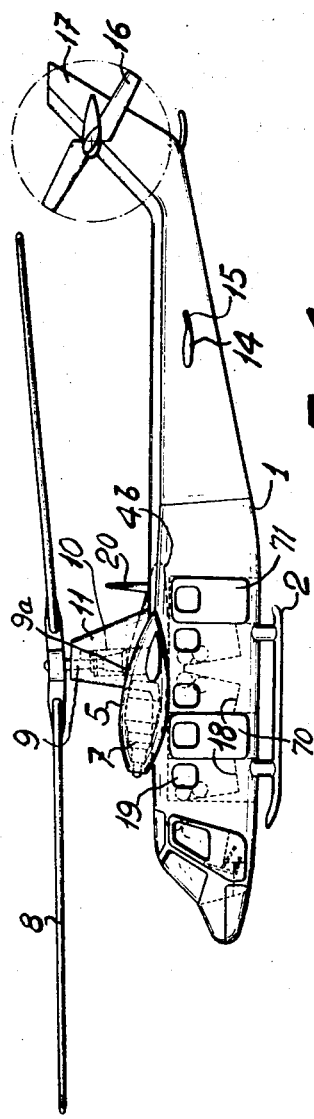
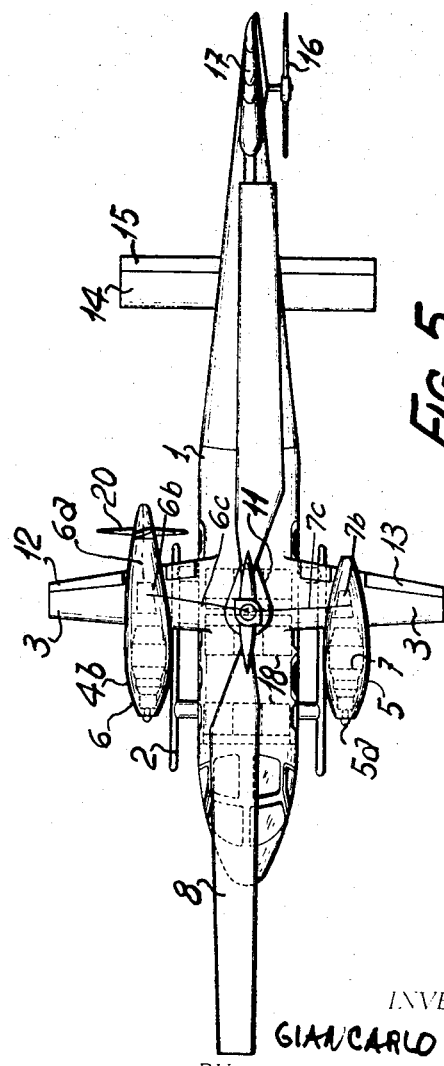

HIGH-SPEED HELICOPTER CHARACTERIZED BY A LIFTING WING AND BY TWO ENGINES FITTED THEREON

This invention relates to a helicopter for the conveyance of passengers and goods, and in particular to an arrangement permitting the vehicle to reach a high cruising speed with a low level of vibration. The vehicle may be provided with an auxiliary propeller, comprising an airscrew located on the side opposite to the tail rotor and shifted in respect to longitudinal axis of fuselage.

The arrangement of components according to the invention, avoids the drawbacks of conventional helicopters, and ensures a higher degree of safety and reliability. The vehicle of the present invention is characterized by:

a main rotor and an auxiliary rotor tail,
mechanical gear and shaft drive transmission,
the main rotor comprising a semirigid, two-bladed rotor,
a passenger compartment located substantially at the center of gravity,
a fixed lifting wing adapted to decrease vibrations caused by the rotor as a consequence of any aerodynamic dissymmetry between the advancing blade and the retreating blade, thus partly discharging the main rotor and decreasing the cyclic pitch required to balance the advancing and retreating blades,
two engines, installed in nacelles located on the wings outside of the fuselage, the nacelles being symmetrically spaced in respect to the longitudinal axis, thereby permitting easy accessibility for maintenance, a highly efficient dynamic air intake, an easy shutting down of a malfunctioning engine and a decrease of noise in the passenger compartment,
flaps located on trailing edge of the lifting wing in order to obtain the full measure of required lift from the wing, by varying the curvature of aerofoil section. In fact, at a certain speed, by varying the position of the center of gravity, the air density, etc., the helicopter attitude can be changed. It is also possible to improve the helicopter's lateral capability by differentially moving the right and left flaps which are connected to the lateral cyclic pitch;
a tail surface comprising a fixed part (stabilizer) and a movable part acting as an elevator for the longitudinal control of helicopter, in addition to longitudinal cyclic pitch;
fairing of all main controls and of motor shaft;
a reduced cross-section of fuselage arranging people on several row of seats and;
a limited surface area of windows, to decrease the noise in the cabin.

Figure 1:
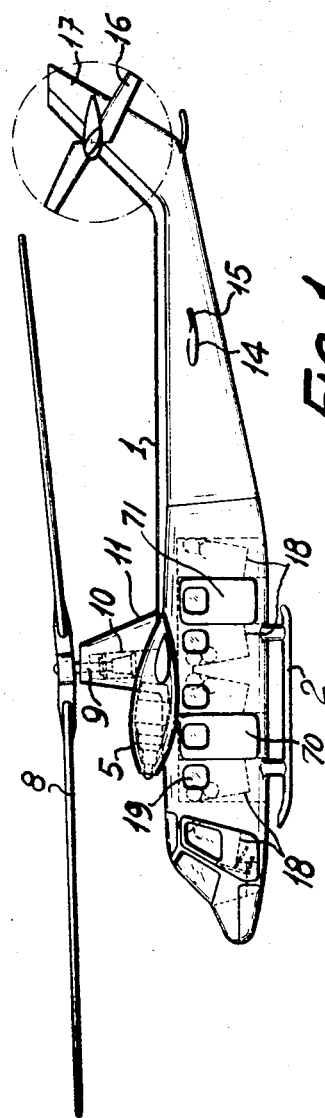
Figure 2:
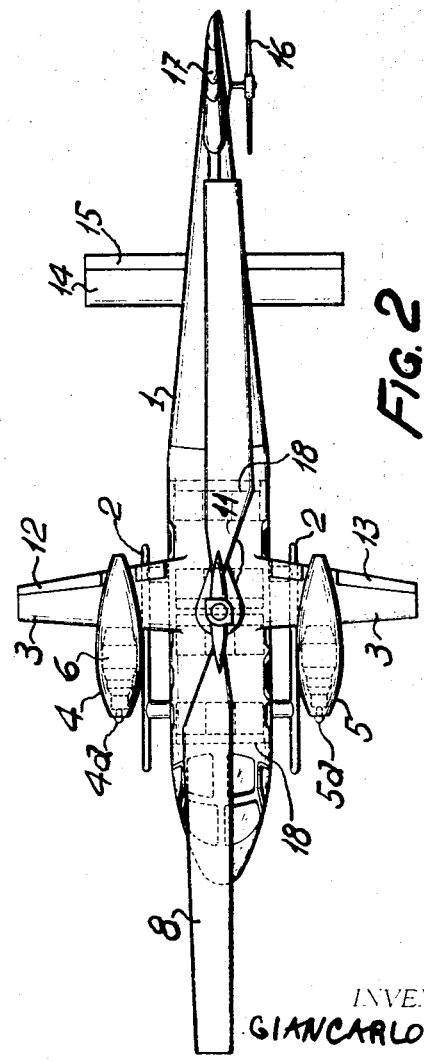

The above and further features of the invention will be better appreciated from a consideration of the following, detailed description of a helicopter according to the invention, taken with the accompanying drawings wherein:

FIGS. 1, 2 and 3 respectively are a side view, a plan view and a front view of a winged helicopter, and FIGS. 4, 5 and 6 respectively are a side view, a plan view and a front view of a helicopter, employing an added propeller.

Referring now to FIGS. 1, 2 and 3 the winged helicopter consists of a fuselage 1, fitted with a landing gear 2 and with a wing 3, wherein two nacelles 4, 5, having dynamic air intakes 4a, 5a, accommodating engines 6, 7 of the turbine-shaft type. The rotor 8, of the semirigid, two-bladed type, is mounted on and driven by the drive shaft 9 regulated controls 10, all being enclosed in a streamlined fairing 11. The engines 6 and 7 are mounted on each of the wings 3 remote from the fuselage and are connected with the controls 10 and drive shaft 9 by reduction gear transmissions 6b and 7b, via a transverse shaft 6c and 7c, respectively. A further reduction gear 9a is provided with respect to the drive shaft 9. The wing 3 supplies the lift in addition to that of the rotor, thereby reducing the vibrations. The wings are also fitted with flaps 12, 13 controlled by the pilot via suitable electrical or mechanical controls, in order to adjust the lift of the wing by varying the curvature of aerofoil section. The flaps 12, 13 can be differently adjusted in the manner of ailerons, whereby a supplemental lateral control is obtained, in addition to that allowed by the lateral cyclic pitch.

Fitted on the tail boom of the fuselage 1 is a horizontal tail surface 14, consisting of a stabilizer and an elevator 15 for the longitudinal control of the helicopter.

The helicopter is completed, as usually, by a tail rotor 16, located sidewise of the vertical extension 17.

To reduce the cross-section of fuselage 1, the passengers' and pilots' seats 18 are arranged in a row of pairs transversely of the axis and without a central aisle. The windows 19 have a reduced surface area to decrease the noise in the cabin and doors 70 and 71 are provided.

Another embodiment is shown in FIGS. 4, 5 and 6. It essentially consists of the structure shown in FIGS. 1–3 and has in addition an auxiliary propulsion system, comprising an airscrew 20, fitted in the extended rear end of nacelle 4b. The engine 6 is provided with a transmission 6a to airscrew 20.

As shown in FIGS. 4–6, the airscrew or propeller 20 is located on the side opposite to that of tail rotor 16 and is offset with respect to axis of fuselage, whereby it also acts to decrease or reduce or neutralize the torque reaction i.e., lead of the tail rotor 16 insuring that the whole output of the engine 6 is transmitted to main rotor, with a consequent lightening advantage. Thus it is possible to attain a higher cruising speed, with obvious economic advantages, notwithstanding a slight decrease in the useful load capacity.

The addition of fixed wing 3 allows an external load to be installed and facilitates the carrying of a load outside of the fuselage.

While a specific form of the invention has been herein shown and described, various obvious changes may be made particularly with regard to the structural design of helicopter, and without departing from the spirit of the invention, as defined in the appended claims.

I claim:

1. A helicopter comprising in combination an elongated fuselage, a fixed lift wing extending horizontally from each side of said fuselage, an engine mounted on each of said wings symmetrically spaced with respect to the axis of said fuselage, a first rotor located above said fuselage to rotate in a horizontal plane, a second rotor located at the tail of said fuselage and on one side thereof to rotate in a vertical plane parallel to said fuselage, transmission means connecting said first and second rotors to each of said engines, and a propeller connected to the engine located on the side of said fuselage opposite to that of said second rotor, said propeller in a plane perpendicular to the axis of said fuselage to reduce the load of said second rotor.

2. The helicopter according to claim 1, wherein said transmission means comprises a vertical drive shaft and rotor control means depending from said first rotor centrally of said fuselage, and gear and shaft means connecting said drive shaft to each of said engines.

3. The helicopter according to claim 1, including a horizontal tail surface extending from said fuselage rearwardly of said fixed wings and forward of said second rotor.

4. The helicopter according to claim 1, wherein each of said fixed wings includes flap members along their trailing edge, means for moving said flap members, and control means for adjusting said flap members jointly or independently.

5. The helicopter according to claim 1, wherein said propeller is located at the trailing edge of said fixed wing.

6. The helicopter according to claim 3, wherein said horizontal tail surface consists of a fixed section and of a movable section to trailing edge thereof, respectively acting as a stabilizer and as an equalizer for the longitudinal control of helicopter.

7. The helicopter according to claim 1, the rotor driving shaft and the controls thereof are enclosed within a streamlined fairing.

* * * * *